United States Patent
Zaitoun et al.

(10) Patent No.: US 12,391,865 B2
(45) Date of Patent: Aug. 19, 2025

(54) METHOD FOR CONTROLLING THE MIGRATION OF FORMATION FINES

(71) Applicant: POWELTEC, Rueil Malmaison (FR)

(72) Inventors: Alain Zaitoun, Rueil Malmaison (FR); Nazanin Salehi, Rueil Malmaison (FR); Jérôme Bouillot, Rueil Malmaison (FR); Arnaud Templier, Rueil Malmaison (FR); Nicolas Gaillard, Rueil Malmaison (FR)

(73) Assignee: POWELTEC, Rueil Malmaison (FR)

( * ) Notice: Subject to any disclaimer, the term of this patent is extended or adjusted under 35 U.S.C. 154(b) by 79 days.

(21) Appl. No.: 18/021,744

(22) PCT Filed: Aug. 11, 2021

(86) PCT No.: PCT/EP2021/072335
§ 371 (c)(1),
(2) Date: Feb. 16, 2023

(87) PCT Pub. No.: WO2022/043055
PCT Pub. Date: Mar. 3, 2022

(65) Prior Publication Data
US 2023/0323190 A1    Oct. 12, 2023

Related U.S. Application Data

(60) Provisional application No. 63/083,329, filed on Sep. 25, 2020.

(30) Foreign Application Priority Data

Aug. 31, 2020   (FR) .................................. 2008830

(51) Int. Cl.
*C09K 8/575* (2006.01)
*C08F 220/56* (2006.01)
*E21B 33/138* (2006.01)

(52) U.S. Cl.
CPC .......... *C09K 8/5753* (2013.01); *C08F 220/56* (2013.01); *E21B 33/138* (2013.01)

(58) Field of Classification Search
CPC .... C09K 8/5753; C08F 220/56; E21B 33/138
See application file for complete search history.

(56) References Cited

U.S. PATENT DOCUMENTS

| | | | | |
|---|---|---|---|---|
| 4,103,742 A | * | 8/1978 | Swanson | C09K 8/76 507/903 |
| 4,497,596 A | | 2/1985 | Borchardt et al. | |

(Continued)

FOREIGN PATENT DOCUMENTS

| | | |
|---|---|---|
| CA | 2 940 886 A1 | 3/2018 |
| CN | 104861110 A | 8/2015 |

(Continued)

OTHER PUBLICATIONS

Dec. 9, 2021 International Search Report issued in International Patent Application No. PCT/EP2021/072335.

(Continued)

*Primary Examiner* — Aiqun Li
(74) *Attorney, Agent, or Firm* — Oliff PLC (57) ABSTRACT

A method for limiting and/or preventing the migration of fines in a geological formation, in particular a subterranean formation, the method including bringing the formation into contact with one or more copolymers including at most 40 mol % of repeating units derived from a cationic monomer.

20 Claims, 3 Drawing Sheets

(56) References Cited

U.S. PATENT DOCUMENTS

| | | | |
|---|---|---|---|
| 4,563,292 A | 1/1986 | Borchardt | |
| 2005/0256012 A1* | 11/2005 | Smith | C09K 8/5083 |
| | | | 507/120 |
| 2008/0110624 A1* | 5/2008 | Nguyen | C09K 8/685 |
| | | | 507/224 |
| 2009/0014178 A1 | 1/2009 | Kotlar et al. | |
| 2011/0092396 A1* | 4/2011 | Cliffe | C09K 8/24 |
| | | | 507/120 |

FOREIGN PATENT DOCUMENTS

| | | | |
|---|---|---|---|
| CN | 105693925 A | 6/2016 | |
| CN | 105694837 A | 6/2016 | |
| CN | 106905935 A | 6/2017 | |
| WO | 02/097235 A1 | 12/2002 | |

OTHER PUBLICATIONS

Nov. 24, 2022 International Preliminary Report on Patentability issued in International Patent Application No. PCT/EP2021/072335.

* cited by examiner

METHOD FOR CONTROLLING THE MIGRATION OF FORMATION FINES

TECHNICAL FIELD

The present invention relates to a method for treating rock formations. The invention relates more particularly to a method for limiting and/or preventing the migration of fines in a geological formation, in particular a subterranean formation, said method comprising bringing the formation into contact with one or more copolymers comprising at most 40% by weight of repeating units derived from a cationic monomer.

PRIOR ART

Hydrocarbons, in particular oil or gas, and geothermical fluids (water) are recovered from subterranean formations by drilling a well in the formation and by extracting the fluids (hydrocarbons and/or water).

Subterranean formations generally comprise sandstone in which the grains of sand are tightly bound together. These compact grains form the basic structure of the formation. Subterranean formations also comprise small particles, known as "fines", which are composed of sand and also of other particles such as, for example, quartz, clays, iron minerals, alkaline-earth metal carbonates, etc. These fines occupy the pores or the interstitial spaces formed by the compacting of the grains of sand in the formation. They constitute the natural cement of the rock.

During the extraction of fluids (hydrocarbons and/or water), in particular those located in weakly consolidated formations, effective control of the movement or migration of the particles in the production well is an essential preoccupation. Such particle movement or migration generally occurs around the well under the effect of the high flow rates, or after hydraulic fracturing of a subterranean formation. A movement may also occur suddenly in the event of collapse of a section of the well, thus causing large amounts of fines to circulate. Indeed, in weakly consolidated formations, the fines have a tendency to frequently block the passages leading to the production well and to migrate inside the latter via the produced fluid flow.

These unwanted particles can lead to numerous problems in the efficient extraction of oil and gas from subterranean geological formations. For example, the fines have a tendency, on the one hand, to block the small porous spaces of the formation and, consequently, to reduce its permeability, and on the other hand, to block the flow tubes and lines used for hydrocarbon extraction. Furthermore, the fines are very abrasive and can also lead to erosion of the casing, and damage to the equipment at the well bottom (such as pumps, etc.) and to the surface equipment. After extraction, the particles must be separated from the hydrocarbons and eliminated at the surface.

These particles can also generate problems when water is pumped from subterranean geological formations. For example, in deep geothermic applications, water from water table is pumped to the surface to recover heat and/or energy. In case of low consolidated rock formations, fine particles can propagate and generate the same problems of pore plugging in the reservoir than those observed in the extraction of hydrocarbons. This leads to a lower efficiency in pumping the heating fluid to the surface resulting in energy losses.

Lastly, the migration and accumulation of fine particles can also generate damages in the near wellbore area, when water is injected in a rock formation through an injection well. For example, water injection is performed in enhanced oil recovery applications, in order to push the hydrocarbons from an injection well towards a production well. Fine migration can occur in the near wellbore area of the injection well, resulting in the impairment of injectivity. As a consequence, the flow rates of injection decrease as well as the efficiency of hydrocarbon recovery.

These problems lead to high maintenance costs and unacceptable well interruption times, or even the closure of the production or injection well since it becomes economically unattractive.

Numerous methods have been proposed for controlling the movement or migration of the fines of weakly consolidated formations, in particular sand, during hydrocarbon production operations. These methods are often based on the setting up of sand screens or of a gravel pack (mechanical methods) or else the injection of consolidation materials, such as resins, into the formation (chemical methods) in order to prevent the fines from penetrating the well.

For example, sand screens are metal grids placed around the circumference of the production tube and serve to retain the fines and the grains of sand before the hydrocarbon enters the production tube. However, sand screens can be considerably damaged by the production of fines at high flow rate and at high pressure. The damage to the sand screens in this context leads to earlier degradation of the sand screens and earlier production of grains of sand and of fines, thus increasing the movement and migration of the grains and of the particles and the recovery costs.

Setting up a gravel pack is a widely carried out method for preventing sand production from poorly or non-consolidated formations. This method consists in pumping a calibrated gravel sludge in a carrier fluid into the annular space between a centralised screen and a perforated casing or an open hole. As the pumping continues, the carrier fluid flows in the formation through the screen and rises back up to the surface. Thus, the packed gravel creates a high-permeability granular filter and prevents the sand of the formation from penetrating the well. However, this technique requires complex operations for setting up the equipment and the gravel pack, and is difficult to use in deviated and horizontal wells. This technique is also a relatively expensive method. Furthermore, the fines can either pass the gravel bed and continue to be produced at the surface, or can accumulate in the gravel bed, while gradually clogging it, leading to a decline in well production.

The resins that are used in the consolidation of fines comprise epoxides, furans, pure phenolic resins and furan/phenolic mixtures. The resins are in liquid form when they are injected into the formation, then they harden and form a consolidated mass, bonding the grains of sand to one another at their points of contact, thus preventing migration thereof. However, there are certain limits to the use of these resins, linked to their tendency to block the pores of the formation, thus reducing permeabilities to hydrocarbons and to water. This results in a considerable reduction in production flow rate. Furthermore, the resin solution must be premixed at the surface, with a catalyst or a crosslinking agent required for curing the resin. These steps require time and/or an increase in temperature and are considered to be not environmentally friendly. Finally, the injection of these resins cannot be used together with hydraulic fracturing, fracture acidification and acid stimulation treatments.

There is therefore a continuous need for improved and more effective well treatments that are capable of reducing or preventing the migration of grains of sand and of fines, and in particular of sand particles, during the operating of a hydrocarbon well without unduly restricting productivity.

In this respect, other chemical treatments have been proposed. For example, document U.S. Pat. No. 4,497,596 describes a method for stabilising fines in a permeable subterranean formation, which comprises bringing the fines into contact with an effective amount of an organic polycationic polymer comprising two quaternary ammonium functions in the repeating unit of the polymer.

Document US 2009014178 describes a method for treating a subterranean formation in order to prevent the migration of sand particles, comprising the injection of cationic polymers in the form of a dispersion or a solution in a liquid support at a concentration ranging from 5% to 50% by volume. The polymers used are chosen from polyamino acids, poly(diallylammonium salts) and mixtures thereof.

Document U.S. Pat. No. 4,563,292 describes a method for averting or reducing the migration of fines in a permeable structure, which comprises bringing the fines into contact with organic copolymers that may be either non-ionic in a neutral medium, or copolymers comprising up to 95% by weight of a monomer comprising a quaternary ammonium salt.

Document CN104861110 describes an agent for preventing the migration of sand in a permeable formation, prepared from a composition comprising water and from 10% to 35% of acrylamide or of methacrylamide, from 5% to 25% of 2-acrylamido-2-methylpropanesulphonate, from 1% to 5% of styrene or of acrylonitrile, and from 5% to 20% of acryloyloxyethyltrimethylammonium chloride or of trimethylallylammonium chloride.

Document WO 02/097235 describes a method for reducing the amount of water present in oil production wells, comprising the injection around the well of an aqueous solution comprising a cationic polymer.

Document CA2940886 describes polymers comprising non-ionic monomers, anionic monomers, and cationic monomers, and their use for the consolidation of fine fluid tailings (FFT), such as oil sands FFT, by polymer flocculation.

Document CN105694837 and CN105693925 describes a polymer for chemical sand control in loose sandstone reservoirs or in oil and water wells, said polymer comprising acrylamide units or 2-acrylamido-2-methylpropanesulfonic acid (AMPS) units, dimethyl diallyl ammonium chloride units and an organosilane coupling agent.

Document CN106905935 describes a composition comprising a cationic resin, a mutual solvent, and an acidizing additive, for treating solid particles. The resin comprises repeating units derived from a non-ionic monomer and a cationic monomer.

However, the methods described in those three last documents (CN105694837, CN105693925 and CN106905935) are executed with little knowledge of, or consideration for, the wettability of the formation being treated.

In fact, a large number of impediments to production can be attributed to improper formation wettability. The wettability is the strong preference of adhesion of a liquid phase (hydrocarbons or water) with the surface of the formation. The wettability of a reservoir can change from a water wettability to an oil wettability (hydrocarbons) under the influence of several parameters including pH, the chemical composition of the hydrocarbons, the topography of the surface, the pressure and the temperature. This results in a modification of the relative permeability of the reservoir and has direct consequences on the fluids production yield.

The applicant has discovered, surprisingly, that the choice of specific copolymers makes it possible to improve the effect of sand control technology while keeping the wettability of the formation constant throughout the process of extraction of the fluids (hydrocarbons and/or water), therefore increasing the efficiency of fluids recovery. The applicant has found that the composition and the chemical properties of the copolymers injected into the formation to be treated are very critical to achieve the expected technical goal.

In particular, the applicant has found that the use of cationic copolymers comprising at most 40 mol % of repeating units derived from a cationic monomer is more effective than the prior art methods for averting and/or reducing and/or limiting and/or preventing the migration of fines in formations, in particular subterranean formations.

The applicant has also found that the use of copolymers comprising at least 90 mol % of repeating units derived from a cationic monomer of formula (Ia) and/or (Ib) as described in detail below and repeating units derived from a neutral monomer of formula (II) as described in detail below, is more effective for sand control, does not alter the wettability of the formation and does not lead to variations of the reservoir fluid conditions.

SUMMARY OF THE INVENTION

The present invention relates to a method for averting and/or delaying and/or limiting and/or preventing the migration of fines in a geological formation, said method comprising bringing the formation into contact with one or more copolymers comprising:

at most 40 mol %, preferably at most 30 mol %, preferably at most 20 mol % of monomeric units derived from one or more cationic monomers of formula (Ia) and/or (Ib)

in which
R$_4$ represents a hydrogen atom or a methyl radical,
R$_1$, R$_2$, and R$_3$, which may be identical or different, represent an ethyl radical or a methyl radical,
m represents an integer between 1 and 4, preferably 2 to 3,
n represents 1 or 2,
Y represents NH or O, and
X$^-$ represents an anion chosen from bromide or chloride ions, preferably chloride ions,
at least 60 mol % of monomeric units derived from one or more neutral monomers of formula (II)

in which
R$_5$ represents a hydrogen atom or a methyl radical,
R$_6$ and R$_7$ represent, independently of one another, a hydrogen atom or an alkyl radical comprising from 1 to 4 carbon atoms, which is optionally substituted with a hydroxyl group.

According to a favourite embodiment, the sum of the repeating units derived from the cationic monomer of formula (Ia) and/or (Ib) and the repeating units derived from the neutral monomer of formula (II) represents at least 90 mol % of the total sum of the repeating units of the copolymer.

According to a preferred embodiment, the copolymer used in the method according to the invention comprises only repeating units derived from the cationic monomer of formula (Ia) and/or (Ib) as described above and in details below and repeating units derived from the neutral monomer of formula (II) as described above and in details below.

According to one preferred embodiment, in formula (Ia), $R_1=R_2=R_3=CH_3$.

According to one preferred embodiment in formula (Ib), $R_1=R_2=R_3=CH_3$.

In one preferred embodiment, the cationic monomers of formulae (Ia) and (Ib) are chosen from diallyldialkylammonium and allyltrialkylammonium salts; acidified or quaternized salts of dialkylaminoalkyl acrylates and acidified or quaternized salts of dialkylaminoalkyl methacrylates, and acidified or quaternized salts of dialkylaminoalkylacrylamides or of dialkylaminoalkylmethacrylamides.

Advantageously, the cationic monomers of formula (Ia) and (Ib) are chosen from diallyldimethylammonium chloride (DADMAC), (2-(Acryloyloxy)ethyl)trimethylammonium chloride (ADAMEMC), (2-(Methacryloyloxy)ethyl) trimethylammonium chloride (MADAMEMC), (3-methacrylamidopropyl)trimethylammonium chloride (MAPTAC) and (3-acrylamidopropyl)trimethylammonium chloride (APTAC).

According to one embodiment, in formula (Ia), Y represents NH.

According to one preferred embodiment, the monomer of formula (II) is chosen from acrylamide, methacrylamide, N,N-dimethylacrylamide, N-methylmethacrylamide, N-ethylmethacrylamide, N-propylmethacrylamide, N-isopropylmethacrylamide, N-(2-hydroxyethyl)methacrylamide, N-methylacrylamide, N-ethylacrylamide, N-propylacrylamide or N-(2-hydroxyethyl)acrylamide, and N-[2-hydroxy-1,1-bis(hydroxymethyl)ethyl]propenamide.

Advantageously, the monomer of formula (II) is chosen from acrylamide; N,N-di-methylacrylamide; N-[2-hydroxy-1,1-bis(hydroxymethyl)ethyl]propenamide; and 2-hydroxyethyl acrylamide.

According to one preferred embodiment, the copolymer has an average molar mass ranging from $3\times10^6$ g·mol$^{-1}$ to $12\times10^6$ g·mol$^{-1}$.

According to one preferred embodiment, the formation treated is a subterranean formation, preferably a subterranean formation in contact with an oil and/or gas production well.

According to another embodiment, the formation treated is a subterranean formation in contact with a water table.

Preferably, the polymer(s) are in a carrier fluid.

Preferably, the carrier fluid is water.

Preferably, the carrier fluid comprises from 500 to 5000 ppm of copolymers as defined above and in greater detail below.

According to one embodiment, the method according to the invention also comprises a step of pre-treating the formation before the bringing into contact with the copolymer(s) as defined above and in greater detail below.

DETAILED DESCRIPTION

The expression "essentially consists of" followed by one or more characteristics means that components or steps which do not significantly modify the properties and characteristics of the invention can be included in the method or the material of the invention, in addition to the explicitly listed components or steps.

The expression "between X and Y" includes the limits, unless otherwise stated. This expression therefore means that the targeted range comprises the values X and Y and all the values ranging from X to Y.

The various embodiments, variants, preferences and advantages described above for each of the subjects of the invention apply to all the subjects of the invention and can be taken separately or in combination.

The present invention relates to a method for treating all or part of a geological formation using copolymers comprising at most 40 mol % of repeating units derived from a cationic monomer, as defined above or in detail below.

The formation generally consists of a consolidated or non-consolidated rock with a permeability ranging from 1 mD to several Darcy and through which the fluids (oil, water or gas) can propagate.

In particular, the invention relates to the treatment of subterranean or non-subterranean geological formations comprising grains of sand and/or fines.

Advantageously, the method of the invention is applied for formations in which the water in place has a salinity of less than or equal to 250 g/L.

According to one embodiment, the formation is a subterranean formation.

Advantageously, the subterranean formation to be treated is in contact with one or more gas-producing or oil-producing wells, and/or one or more water injection wells aimed at flushing hydrocarbons (oil or gas) reservoirs, and/or one or more mine gas wells, and/or one or more gas storage wells, and/or one or more water producing well.

For the purposes of the invention, the term "the formation is in contact with one or more wells" is intended to mean that the geological formation or a part of the geological formation is traversed by a relatively deep well made by suitable means, such as for example drilling machines, with the aim of discovering or exploiting a subterranean deposit, whether it is a mining, oil or gas deposit or a geothermical well.

The method of the invention can be carried out in vertical, inclined or horizontal wells. The term "vertical well" denotes a part of a well in a subterranean formation that is substantially vertical. The term "horizontal well" denotes a part of a well in a subterranean formation that is substantially horizontal. The term "inclined well" denotes a part of a well in a subterranean formation that is inclined at an angle between that of a vertical well and of a horizontal well.

According to an embodiment, the subterranean formation is in contact with a gas-producing or oil-producing well.

For the purposes of the invention, the term "gas-producing or oil-producing well" is intended to mean a well drilled from the surface of an oil or gas field or deposit allowing hydrocarbon extraction.

According to another embodiment, the subterranean formation is in contact with a water injecting well or a water producing well.

For the purpose of the invention, the term "water injecting well" is intended to mean a well drilled from the surface of an oil or gas field into which water is pumped in order to push hydrocarbons out of underground reservoirs toward production wells. A water injecting well may also mean a well drilled from the surface of a deposit containing a water table (aquifer) allowing injection of water.

For the purposes of the invention, the term "water-producing well" is intended to mean a well drilled from the surface of a deposit allowing water extraction.

The gas-producing or oil-producing well, the water injecting well or the water producing well may be vertical, horizontal or inclined.

The method according to the invention has the advantage of being applicable over wide temperature ranges. For example, the treatment described above and in detail below can be carried out in geological formations, preferably subterranean geological formations, preferably subterranean formations in contact with gas-producing or oil-producing wells or water injecting wells or water producing wells, the temperature of which is between 0° C. and 200° C.

The method according to the invention makes it possible to efficiently control the migration of the grains of sand and/or the fines in a geological formation using the copolymers as defined above and in detail below. Indeed, the use of these copolymers makes it possible to avert and/or delay and/or limit and/or prevent the migration of grains of sand and/or fines in a geological formation, preferably in a subterranean geological formation, more preferably in a subterranean formation in contact with a gas-producing or oil-producing well or water injecting well or water producing well.

For the purposes of the invention, the terms "fines", "fine particles", "sand particles" or "sand" are intended to mean minute inorganic particles included in a formation, and generally having an average diameter of 120 microns or less.

The copolymers defined above and in detail below are particularly effective for averting and/or reducing and/or limiting and/or preventing the migration of fines such as silica, iron minerals such as, for example, hematite, magnetite, lepidocrocite, wuestite, akageneite and siderite, clays such as, for example, smectite, kaolinite, illite, etc., and alkaline-earth metal carbonates such as calcite and dolomite, etc. The fines can also be mixed with clay minerals, feldspar, quartz and other siliceous minerals.

The Copolymer

The method for treating formations according to the invention comprises the use of one or more copolymers comprising at most 40% of repeating units derived from at least one cationic monomer and at least 60% of repeating units derived from at least one neutral monomer.

According to one embodiment, the copolymer also comprises monomeric units derived from anionic monomer.

For the purposes of the invention, the term "copolymer" is intended to mean a macromolecule derived from the copolymerization of at least two types of monomers, which are chemically different. This term also covers terpolymers and tetrapolymers.

For the purposes of the invention, the term "copolymerisation" is intended to mean that the polymerisation reaction uses at least two different monomers.

For the purposes of the invention, the term "monomeric unit", "repeating unit" or "constituent unit" is intended to mean the largest constituent unit of a part of the structure of the copolymer and which is directly generated by a single monomer molecule.

In the subsequent text, the proportions by percentage of the various monomers or of the constituent units in the copolymers are expressed in moles.

The Cationic Monomer

The copolymer used in the method of the invention comprises monomeric units derived from one or more cationic monomers of formula (Ia) or (Ib)

(Ia)

(Ib)

in which
R$_4$ represents a hydrogen atom or a methyl radical,
R$_1$, R$_2$ and R$_3$, which may be identical or different, represent an ethyl radical or a methyl radical, m represents an integer between 1 and 4,
n represent 1 to 2,
Y represents NH or O, and
X$^-$ represents an anion chosen from the group consisting of chloride, bromide, iodide, sulphate, hydroxyl, methyl sulphate, and mixtures thereof.

The monomeric units derived from the cationic monomer can be derived from the monomer (Ia) alone, from the monomer (Ib) alone or from mixtures thereof. For the purposes of the invention, the term "mixtures thereof" is intended to mean the mixtures of the monomers (Ia) and (Ib) in any proportions.

According to a first embodiment, the cationic monomer is a monomer of general formula (Ia):

(Ia)

in which
R$_4$ represents a hydrogen atom or a methyl radical,
R$_1$, R$_2$ and R$_3$, which may be identical or different, represent an ethyl radical or a methyl radical,
m represents an integer between 1 and 4,
Y represents NH or O, and
X$^-$ represents an anion chosen from the group consisting of chloride, bromide, iodide, sulphate, hydroxyl, methyl sulphate, and mixtures thereof.

Advantageously, according to this embodiment, in formula (Ia), R$_1$, R$_2$ and R$_3$ are identical.

More advantageously, R$_1$, R$_2$ and R$_3$ represent a methyl radical.

Advantageously, in formula (Ia), m is equal to 2 or 3.

Advantageously, the cationic monomers of formula (Ia) are chosen from acidified or quaternized salts of dialkylaminoalkyl acrylates, acidified or quaternized salts of dialkylaminoalkyl methacrylates, and acidified or quaternized salts of dialkylaminoalkylacrylamides or of dialkylaminoalkylmethacrylamides.

These acidified or quaternized salts are obtained by means well known to those skilled in the art. The acidified salts can be notably obtained by protonation for example, using hydrochloric acid. The quaternized salts can be obtained by reaction with benzyl chloride, methyl chloride, aryl chlorides, alkyl chlorides or dimethyl sulphate.

Advantageously, in formula (Ia), X$^-$ is chosen from bromide or chloride ions, preferably chloride ions.

Preferably, the cationic monomers of formula (Ia) are chosen from:
acidified or quaternized salts of dimethylaminoethyl acrylate (ADAME) and of dimethylaminoethyl methacrylate (MADAME), such as ethanaminium,N,N,N-trimethyl-2-[(1-oxo-2-propenyl)oxy] salts and ethanaminium,N,N,N-trimethyl-2-[(2-methyl-1-oxo-2-propenyl)oxy] salts;
acidified or quaternized salts of dialkylaminoalkylacrylamides or dialkylaminoalkylmethacrylamides, such as propanaminium,N,N,N-trimethyl-3-[(2-methyl-1-oxo-2-propenyl)amino] salts and propanaminium,N,N,N-trimethyl-3-[(1-oxo-2-propenyl)amino] salts.

According to a first variant, in formula (Ia), Y represents NH and the cationic monomers of formula (Ia) are chosen from acidified or quaternized salts of dialkylaminoalkylacrylamides or dialkylaminoalkylmethacrylamides, most particularly from:
propanaminium,N,N,N-trimethyl-3-[(1-oxo-2-propenyl)amino]chloride, also known as (3-acrylamidopropyl) trimethylammonium chloride (APTAC), and propanaminium,N,N,N-trimethyl-3-[(1-oxo-2-methyl-2-propenyl)amino]chloride, also known as (3-methacrylamidopropyl)trimethylammonium chloride (MAPTAC).

According to a second variant, in formula (Ia), Y represents O and the cationic monomers of formula (Ia) are chosen from acidified or quaternized salts of dimethylaminoethyl acrylate (ADAME) and of dimethylaminoethyl methacrylate (MADAME).

According to a second embodiment, the cationic monomer is a monomer of general formula (Ib):

in which

R$_1$, R$_2$ and R$_3$, which may be identical or different, represent an ethyl radical or a methyl radical, n represents 1 or 2, and X$^-$ represents an anion chosen from the group consisting of chloride, bromide, iodide, sulphate, hydroxyl, methyl sulphate, and mixtures thereof.

Advantageously, according to a first variant, in formula (Ib), n is equal to 2.

Preferably, according to this variant, R$_1$ and R$_2$ are identical and each represent a methyl radical.

According to this variant, in formula (Ib), X$^-$ is preferably chosen from bromide or chloride ions, preferably chloride ions.

According to one preferred embodiment, the cationic monomer of formula (Ib) is diallyldimethylammonium chloride (DADMAC).

According to a second variant, in formula (Ib), n is equal to 1.

Preferably, according to this variant, R$_1$, R$_2$ and R$_3$ are identical and each represent a methyl radical.

According to this variant, in formula (Ib), X$^-$ is preferably chosen from bromide or chloride ions, preferably chloride ions.

According to one preferred embodiment, the cationic monomer of formula (Ib) is allyltrimethylammonium chloride.

According to a third variant, the cationic monomer is a mixture of monomers of formula (Ib) wherein n=1 and of monomers of formula (Ib) wherein n=2.

Preferably, according to this variant, the cationic monomer is a mixture of allyltrimethylammonium chloride and of diallyldimethylammonium chloride (DADMAC).

According to a third embodiment, the copolymer contains a mixture of monomers of formula (Ia) and of monomers of formula (Ib).

All the characteristics and preferences presented for the monomers of formula (Ia) and the monomers of formula (Ib) also apply to the mixtures of these monomers.

The copolymer used in the method of the invention comprises at most 40 mol %, preferably at most 30 mol %, more preferably at most 20 mol % of monomeric units derived from the cationic monomer(s) defined above. Advantageously, the copolymer used in the method of the invention comprises from 1 mol % to 40 mol %, preferably from 5 mol % to 30 mol %, more preferably from 5 mol % to 20 mol % of monomeric units derived from the cationic monomer(s) as defined above.

Advantageously, the copolymer used in the method of the invention comprises at most 40 mol %, preferably at most 30 mol %, more preferably at most 20 mol % of monomeric units derived from the monomer of formula (Ia), from the monomer of formula (Ib) or from mixtures thereof. Preferably, the copolymer used in the method of the invention comprises from 1 mol % to 40 mol %, preferably from 5 mol % to 30 mol %, more preferably from 5 mol % to 20 mol % of monomeric units derived from the monomer of formula (Ia), from the monomer of formula (Ib) and from mixtures thereof.

According to a variant, the copolymer used in the method of the invention comprises at most 40 mol %, preferably at most 30 mol %, more preferably at most 20 mol % of monomeric units derived from cationic monomers of formula (Ia) chosen from acidified or quaternized salts of dialkylaminoalkylmethacrylates or dialkylaminoalkylacrylate or dialkylaminoalkylacrylamides or dialkylaminoalkylmethacrylamides as described above, more particularly from acidified or quaternized salts of ADAME or acidified or quaternized salts of MADAME, or APTAC or MAPTAC.

Advantageously, the copolymer used in the method of the invention comprises from 1 mol % to 40 mol %, preferably from 5 mol % to 30 mol %, more preferably from 5 mol % to 20 mol % of monomeric units derived from cationic monomers of formula (Ia) chosen from acidified or quaternized salts of dialkylaminoalkylacrylamides or dialkylaminoalkylmethacrylamides, or dialkylaminoalkylacrylate or dialkylaminoalkylmethacrylates as described above, more particularly from acidified or quaternized salts of ADAMS or acidified or quaternized salts of MADAME, or APTAC or MAPTAC.

The Neutral Monomer

The copolymer used in the method of the invention also comprises monomeric units derived from one or more monomers of formula (II)

in which

R$_5$ represents a hydrogen atom or a methyl radical,

R$_6$ and R$_7$ represent, independently of one another, a hydrogen atom or an alkyl radical comprising from 1 to 4 carbon atoms, which may be optionally substituted with a hydroxyl group.

Advantageously, the monomer of formula (II) is chosen from acrylamide, methacrylamide, N,N-dimethylacrylamide, N-methylmethacrylamide, N-ethylmethacrylamide, N-propylmethacrylamide, N-isopropylmethacrylamide, N-(2-hydroxyethyl)methacrylamide, N-methylacrylamide, N-ethylacrylamide, N-propylacrylamide or N-(2-hydroxyethyl)acrylamide, and N-[2-hydroxy-1,1-bis(hydroxymethyl)ethyl]propenamide.

According to one preferred embodiment, the monomer of formula (II) is chosen from acrylamide; N,N-dimethylacrylamide; N-[2-hydroxy-1,1-bis(hydroxymethyl)ethyl]-propenamide and 2-hydroxyethylacrylamide.

The copolymer used in the method of the invention comprises at least 60 mol %, preferably at least 70 mol %, more preferably at least 80 mol % of monomeric units derived from the neutral monomer(s) as defined above. Advantageously, the copolymer comprises from 60 mol % to 95 mol %, preferably from 70 mol % to 95 mol %, more preferably from 80 mol % to 95 mol % of monomeric units derived from the neutral monomer(s) of formula (II) as defined above.

According to a variant, the copolymer used in the method of the invention comprises at least 60 mol %, preferably at least 70 mol %, more preferably at least 80 mol % of units derived from monomers chosen from acrylamide; N,N-dimethylacrylamide; N-[2-hydroxy-1,1-bis(hydroxymethyl)ethyl]propenamide and 2-hydroxyethylacrylamide. Advantageously, the copolymer comprises from 60 mol % to 95 mol %, preferably from 70 mol % to 95 mol %, more preferably from 80 mol % to 95 mol % of units derived from monomers chosen from acrylamide; N,N-dimethylacrylamide; N-[2-hydroxy-1,1-bis(hydroxymethyl)ethyl]propenamide and 2-hydroxyethylacrylamide.

According to a specific embodiment, the sum of the repeating units derived from the cationic monomer of formula (Ia) and/or (Ib) and the repeating units derived from the neutral monomer of formula (II) represents at least 90 mol % %, preferably at least 95 mol %, more preferably at least 98 mol % and most preferably at least 99.9 mol % of the total sum in moles of the repeating units of which the copolymer is composed. Advantageously, the sum of the repeating units derived from the cationic monomer of formula (Ia) and/or (Ib) and the repeating units derived from the neutral monomer of formula (II) represents 90 mol % to 100 mol %, preferably from 95 mol % to 100 mol %, more preferably from 98 mol % to 100 mol % of the total sum in moles of the repeating units of the copolymer.

Unless otherwise stated, the amounts of the repeating units in the copolymer according to the invention are expressed as molar percentages based on the sum of the moles of all the repeating units comprised in the copolymer.

According to an embodiment, the copolymer used in the method of the invention consists essentially of repeating units derived from the cationic monomer as described above and repeating units derived from the neutral monomer as described above.

According to an embodiment, the copolymer used in the method of the invention comprises only repeating units derived from the cationic monomer as described above and repeating units derived from the neutral monomer as described above.

The Anionic Monomer

According to another embodiment, the copolymer also comprises repeating units derived from an anionic monomer.

When it is present, the anionic monomer is preferably chosen from monomers having a carboxylic function, such as for example acrylic acid, methacrylic acid and their salts, monomers having a sulphonic acid function, such as for example free, partially salified or totally salified 2-acrylamido-2-methylpropanesulphonic acid (also known as 2-methyl-2-[(1-oxo-2-propenyl)amino]-1-propanesulphonic acid or AMPS), vinyl sulphonic acids, and ethylene glycol methacrylate phosphate.

In the context of the invention, the term "partially salified or totally salified" means that the 2-acrylamido-2-methylpropanesulphonic acid is partially or totally in the form of an alkali metal salt, such as for example sodium salt or potassium salt, or of an alkaline-earth metal salt, such as for example a calcium salt or an ammonium salt.

When present, the proportion of repeating units derived from one or more anionic monomers as described above in the copolymer used in the method of the invention is of between 0.05 mol % and 10 mol %, preferably between 0.5 mol % and 5 mol %, more preferably from 0.5 mol % to 2 mol % relative to the total number of repeating units of the copolymer.

Other Characteristics of the Copolymer

Advantageously, the copolymer used in the method of the invention has an average molar mass of at least $3 \times 10^6$ g·mol$^{-1}$, preferentially between $3 \times 10^6$ and $12 \times 10^6$ g·mol$^{-1}$, more preferably between $3 \times 10^6$ and $10 \times 10^6$ g·mol$^{-1}$. The molar mass is understood to be weight-average molar mass. The average molar mass of the polymer can be determined by techniques known to those skilled in the art, such as for example size exclusion chromatography (SEC).

Advantageously, the copolymer used in the method of the invention has a polydispersity of between 1 and 5, preferably between 2 and 3.

For the purposes of the invention, the term "dispersity" or "polydispersity" is intended to mean the molar mass distribution of the various macromolecules within the copolymer. The polydispersity is represented by the ratio of the weight-average molar masses to the number-average molar masses.

The above disclosed molar masses and dispersity of the copolymers used in the method according to the invention are parameters which those skilled in the art are able to adjust using their general knowledge, such as, for example by copolymerizing the monomers in presence of a chain transfer agent.

The copolymers used in the method of the invention may comprise monomer units other than those described above, such as, for example, units derived from silane monomers or organosilane coupling agent monomers. Advantageously, the copolymers used in the method of the invention comprise at most 10 mol %, preferably at most 5 mol %, more preferably at most 2 mol % of units derived from silane monomers or organosilane coupling agent monomers.

According to an embodiment, the copolymer used in the method of the invention does not comprise any organosilane units.

The applicant has observed that the use of prior art copolymers comprising organosilane functions, in addition to the cationic and neutral units described above, results in changes in the wettability of the formation with repercussions on the fluids (hydrocarbon and water) recovery. In fact, the organosilane functions, even when they are present in small amounts in the copolymer, make the surface of the formation hydrophobic and therefore oil-wettable. Now, in an oil-wettable formation, water flows into the larger pores of the formation and hydrocarbons into the smaller pores. This results in a high relative permeability to water and a low relative permeability to hydrocarbons. Thus, the presence of silane functions will favour the invasion of the well by water and lower the hydrocarbon recovery yield.

Moreover, in an oil-wet formation, the adsorption rate of the copolymer on the surface of the formation strongly decreases with the presence of residual hydrocarbons, because in this case the hydrocarbon covers the pore surface and limits the surface to which the polymer can have access. The sand control is therefore less effective.

The specific copolymers described above do not have this drawback when they are used in the method according to the invention, and they do not affect the wettability of the surface of the formation.

The applicant has surprisingly found that the formation remains water-wet when using the copolymers of the invention. In this case, the hydrocarbon fluids flow into the large pores of the formation and the water into the smaller pores. This results in a high relative permeability to hydrocarbons and a low relative permeability to water, which means that it is difficult for water to flow into the formation. The hydrocarbon recovery yields are thus higher. The copolymer used in the method of the invention may be linear or branched.

For the purposes of the invention, the term "branched" is intended to mean a non-linear copolymer having side chains (or branches) attached to a main backbone. These side chains should not be confused with the side (or pendant) groups of linear copolymers.

A branched copolymer differs from a crosslinked copolymer in that the branches or side chains are not interconnected with other molecules of the copolymer to the point of forming a three-dimensional network.

The copolymer according to the invention is not cross-linked.

According to one particularly preferred embodiment, the copolymer used in the method of the invention is linear.

Advantageously, the copolymer according to the invention is in powder form. Preferably, the copolymer is in the form of a powder having a particle size of between 250 microns and 1 mm. Preferably, the copolymer is in the form of a pure powder which does not comprise other components or impurities.

Advantageously, the copolymer used in the method of the invention is water-soluble.

The term "water-soluble" denotes a copolymer which gives an aqueous solution with substantially no insoluble particles when it is appropriately mixed with water. To determine whether a solution is free of insoluble particles, it is sufficient to perform tests using conventional light scattering techniques or by passing the solutions through a sufficiently fine filtering sieve capable of separating the insoluble particles.

Advantageously, the copolymer used in the method of the invention is chosen from block copolymers and random copolymers.

According to one preferred embodiment, the copolymer is a random copolymer.

The copolymer described above can be obtained by polymerisation techniques known to those skilled in the art. For example, the copolymer can be prepared in solution by copolymerisation of the various monomers described above by radical polymerisation or by controlled radical polymerisation. By way of example, the copolymer can be prepared by Atom Transfer Radical Polymerisation (ATRP); Nitroxide-Mediated Polymerisation (NMP); degenerative transfer processes such as Iodine Transfer Radical Polymerisation (ITRP) or Reversible Addition-Fragmentation Chain Transfer (RAFT).

Those skilled in the art are able to choose the transfer agents, the polymerisation solvents and also any other reagent required for preparing copolymers from the various monomers described above.

Method According to the Invention

The method according to the invention comprises a step of bringing the geological formation into contact with one or more copolymers as defined above.

For the purposes of the invention, the term "bringing into contact" is intended to mean the application and/or introduction and/or injection of the copolymer(s) as defined above into the formation. When the formation is in contact with a well, in particular a gas-producing or oil-producing well, the treatment is put in place by injecting the copolymer into the well and/or at the edges of the well. The bringing of the formation into contact with the copolymers according to the invention can be carried out by means known to those skilled in the art.

Figure 1:
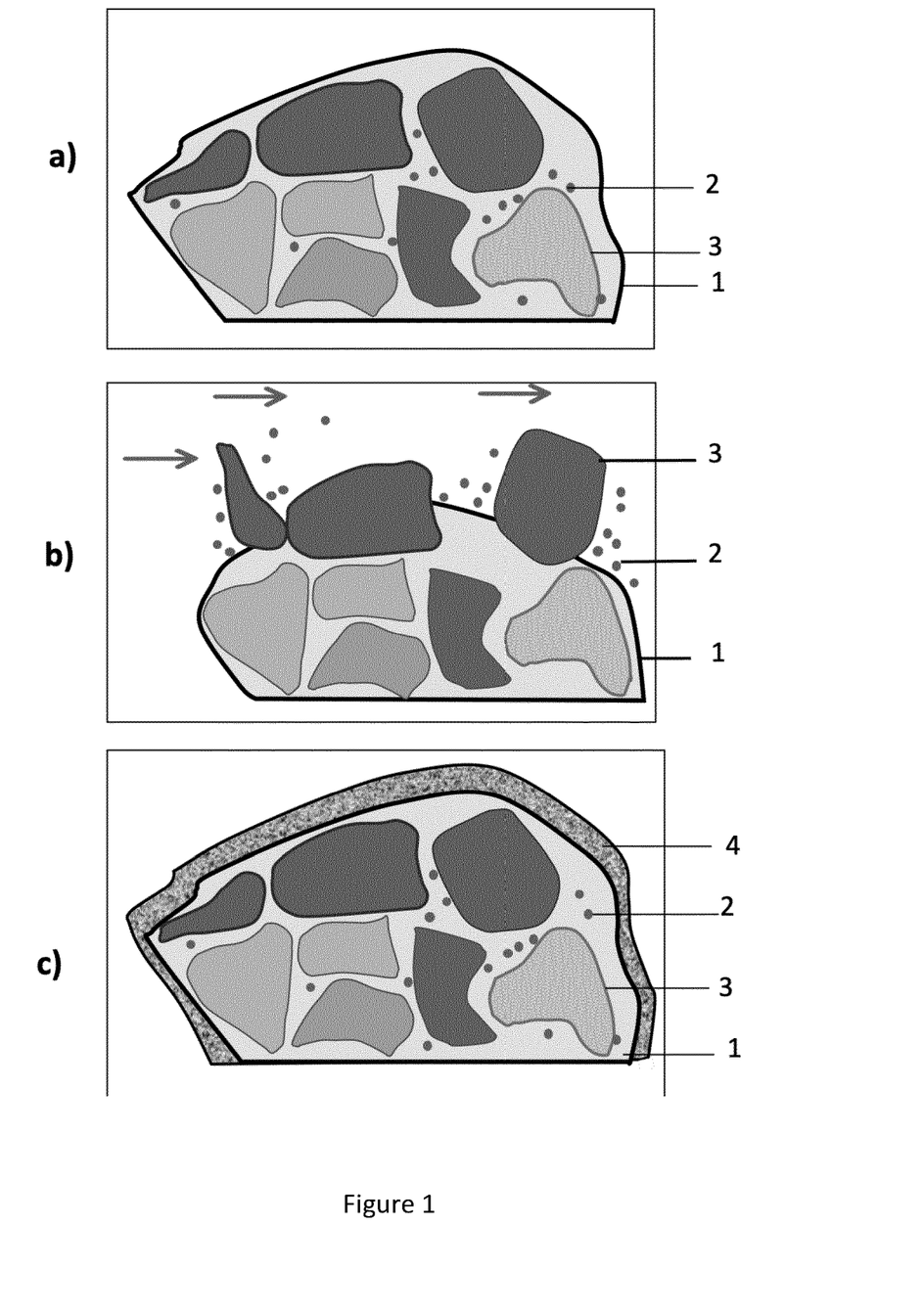
FIG. 1 represents the principle of the treatment of a formation according to the method of the invention; a) represents the non-treated rock of the formation (1) comprising fines (2) and grains of sand (3), b) represents the same non-treated rock (1) in which migration of the fines (2) and of the grains of sand (3) is observed during the hydrocarbon extraction, the arrows represent the direction of extraction of the hydrocarbon and of movement of the grains and particles, and c) represents the same portion of rock (1) in which a copolymer according to the invention has been adsorbed to form a film (4) so as to prevent the fines (2) and the grains of sand (3) from migrating.

In the treatment of a geological formation according to the method of the invention, the bringing of the formation into contact with the copolymer described above makes it possible to form a polymeric film which covers the surface of the formation, thus preventing the fines and the grains of sand from migrating. This mechanism is illustrated by FIG. 1. The copolymer of the invention has a tendency to adsorb onto the entire surface of the rock formation by forming a protective film so as to avert erosion and migration of the fines.

Indeed, the copolymers described above have a strong adsorption energy by virtue of their composition. In particular, the applicant has discovered that the use of copolymers comprising at most 40 mol % of cationic functions allows the formation of a very thick polymeric layer at the surface of the formation. Copolymers having higher cationic function contents have a tendency to adsorb, via all the cationic functions, onto each sand particle, thereby considerably reducing the thickness of the film spread at the surface of the formation and thus its effectiveness in the prevention of the migration of the fines.

Furthermore, the applicant has discovered that copolymers comprising at least 90 mol % of cationic and neutral monomer units as described above, with respect to the total amount in moles of the units of the copolymers, do not desorb from the surface of the formation and the sand grains after treatment and during all the process of extraction of fluids Moreover, the applicant has noted that the thickness of the polymeric film also depends on the average molar mass of the copolymer according to the invention. On the one hand, the use of copolymers having molar masses of less than $3 \times 10^6$ g·mol$^{-1}$ generally does not make it possible to form a film that is sufficiently thick to effectively avert and/or prevent the migration of the fines. On the other hand, the use of copolymers having molar masses greater than $12 \times 10^6$ g·mol$^{-1}$ is often accompanied by difficulty in terms of injectivity of the copolymer into or onto the formation.

According to one embodiment of the method of the invention, the copolymer defined above is dissolved in one or more carrier fluids.

The carrier fluids may be polar or non-polar fluids. Examples of suitable fluids are water and low-molecular-weight alcohols such as methanol, ethanol and isopropanol and also mixtures thereof.

Advantageously, the carrier fluid is water.

According to a specific embodiment, the carrier fluid comprises at least 90% by weight, preferably at least 95% by weight, more preferably at least 99% by weight of water with respect to the total weight of the carrier fluid.

Indeed, the applicant has observed that such water content in the carrier fluid, i.e., at least 90% by weight of water, makes it possible to keep the wettability of the formation constant throughout the hydrocarbon and/or water extraction process. The best results are obtained when the carrier fluid contains very little or no low-molecular-weight alcohol compounds such as methanol.

According to a favourite embodiment, the carrier fluid consists in water.

When water is used as carrier fluid, it can contain other ingredients which have no or almost no effect on the dissolution of the copolymer according to the invention. Examples of ingredients that can be included in the water include salts, surfactants and wetting agents. If present, the amount of these ingredients does not exceed 0.5% by weight, preferably 0.05% by weight with respect. to the total weight of the carrier fluid (water). Alternatively, an aqueous solution comprising surfactants and/or wetting agents may be injected before the copolymer according to the invention is brought into contact with the formation to be treated, in order to clean the surface of the formation and improve the adsorption of the copolymer thereon.

Preferably, the carrier fluid does not include any acidic compounds such as mineral acids or organic acids of low molecular weight. The applicant has found that the pH of the solution to be injected into the formation also plays a fairly important role on the wettability of the formation and thus on production yields. In particular, the applicant has observed that the presence of acidic compounds in the carrier fluid causes a change in the wettability of the formation from water-wettability to oil-wettability, resulting in a decrease in hydrocarbon recovery.

Preferably, the water has a moderate salinity, preferably of less than 250 g/l. The water may be production water, seawater, tap water, soft water (river water, running water) or mixtures thereof, or any other type of water having the desired salinity.

Advantageously, the carrier fluid, preferably water, comprises an amount of the copolymer as defined above ranging from 500 to 10 000 ppm, preferably ranging from 500 to 5000 ppm. Lower concentrations can be used but are not generally very effective. The injection of concentrations greater than 10 000 ppm of copolymers will reduce the permeability of the formation.

Preferably, the carrier fluid comprising the copolymer according to the present invention has a viscosity, after dissolution of the copolymer, ranging from 1.5 mPa·s to 3500 mPa·s at 7.34 s$^{-1}$ and at 25° C.

Those skilled in the art are able to adjust the flow rate for introducing or injecting the composition comprising the copolymer and the carrier fluid, preferably water, as a function of the type of formation to be treated. In addition, the copolymer in the carrier fluid can be introduced into the formation at the desired pressure, provided that said pressure is not above the filtering pressure.

The contact time required for the copolymer according to the invention to efficiently treat the surface of the grains of sand and the fines is very short and can be considered to be instantaneous. According to one embodiment, the method of the present invention is preceded by an optional pre-treatment step which can be carried out, for example, with an aqueous solution containing a surfactant, in order to clean the formation to be treated.

Advantageously, the method of the present invention is followed by a step of treating the formation with brine or gas or oil, in order to push the copolymer as defined above into the formation.

The method of the present invention can be carried out as an isolated treatment, or can be combined with a certain number of operations. For example, the method of the invention can be used jointly with sand consolidation methods, such as the setting up of sand screens, methods for setting up a gravel pack, and acidification or fracturing operations. The step of bringing the formation into contact with the copolymer of the invention can be carried out before or after the setting up of the sand screens and/or the setting up of a gravel pack.

The method of the invention has many advantages, and notably requires limited amounts of copolymers. In addition, the copolymers used in the invention are compatible with the anionic polymers used for example for enhanced oil recovery.

Compared to the injection of curable resins for the treatment of formations, the main advantages of the method of the invention are as follows:
- the use of water-soluble, non-toxic compounds,
- the possibility of treating large surface areas of formations and to variable depths while at the same time using small amounts of product,
- easier control of the formation to be treated, thus limiting the risks of clogging,
- an improved and uninterrupted hydrocarbon product yield.

The method according to the invention may also be of interest for other applications, such as the provisional covering of polluted ground.

EXPERIMENTAL SECTION

The following examples illustrate the invention without limiting the scope thereof.

The following examples are presented in two parts. The first part describes the laboratory procedure used to design a treatment. This procedure consists in using sandstone core samples comprising fine particles that can migrate under the effect of a change in salinity. The second part describes the results obtained in a formation in a natural environment.

I—Laboratory Tests

1—Materials

Sandstone: The tests are carried out on samples in the form of cylindrical core samples from a block of sandstone from Vosges. The core samples have the dimensions 3.81 cm×5.08 cm, have a porosity of 25% and have an absolute permeability of 2 to 3 Darcy. The sandstone core samples have the following mineralogical composition:
Quartz=82%,
Feldspar (90% Orthoclase+10% Albite)=12.5%,
Clays=4.5%,
Hematite=1%.

Brines: Two solutions S1 and S2 are prepared by mixing pure NaCl with deionized water in a ratio of 100 g/l and 5 g/l respectively.

Monomers: acrylamide (CAS N° 79-06-1) and acryloyloxyethyl trimethylammonium chloride (ADAMEMC) (CAS N° 4499-01-0) were purchased from Merk Sigma Aldrich.

2—Preparation and Characterization of the Copolymers

Polymer 1 (according to the invention): it is a copolymer comprising 5 mol % of repeating units derived from ADAMEMC and 95 mol % of monomer units derived from acrylamide. The copolymer has an average molar mass of $6 \times 10^6$ g·mol$^{-1}$ as determined by the method described in Rodriguez, Laurent et al., Monitoring Thermal and Mechanical Stability of Enhanced Oil Recovery (EOR) Acrylamide Based Polymers (PAM) Through Intrinsic Viscosity (IV) Determination Using a New Capillary Rheology Technique, January 2016, DOI 10.2118/179827-MS.

Polymer P2 (comparative): it is a polyacrylamide: a non-ionic polymer comprising 100 mol % of acrylamide units and of molar mass $6 \times 10^6$ g·mol$^{-1}$.

3—Experimental Protocol 3.1—Determination of the Pore Volume Vp of the Core Samples The mass of the sandstone core samples mc is determined beforehand by weighing. The core sample is then placed in a desiccator while maintaining the vacuum. Once the vacuum has been established, the core sample is saturated with brine S1 containing 100 g/l of NaCl, the mass and the density ρ of which are known.

The saturated core sample is then weighed, its new mass is ms. The difference in mass Δm=ms−mc after imbibition of the brine corresponds to the amount of brine present in the pore volume.

The pore volume is calculated according to the following equation:

$$Vp = \frac{\Delta m}{\rho}$$

The pore volume of the sandstone core samples studied is 20 ml.

3.2—Measurement of the Residual Permeability to Water

Figure 2:
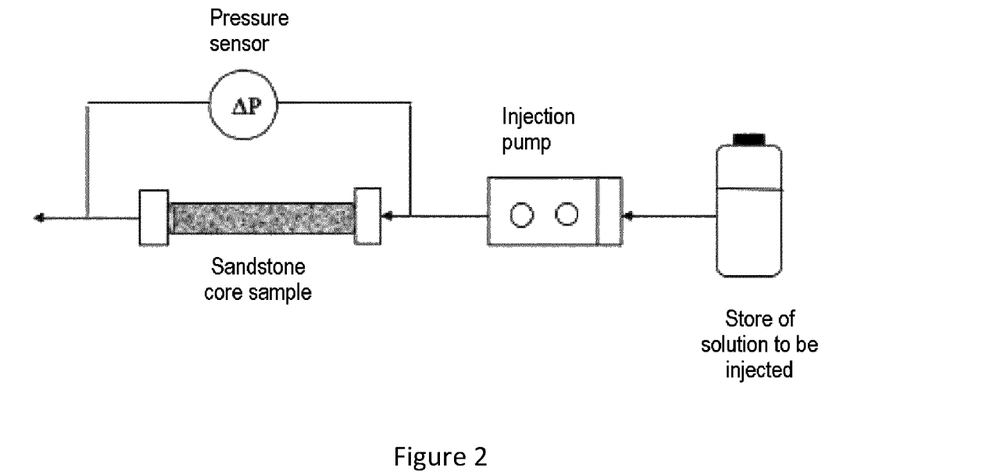
FIG. 2 represents a scheme of the experimental device for measuring the residual permeability to water.

The residual permeability to water $K_w$ of the sandstone core sample represents its capacity to allow water to flow via its pores. The experimental assembly for measuring the residual permeability to water is represented in FIG. 2.

First of all, various solutions are injected into the core samples. These solutions are described in the table below.

TABLE 1

| Core sample | C1(comparative) | C2 (according to invention) | C3 (comparative) |
|---|---|---|---|
| Injection solution | S1 containing 100 g/l de NaCl | S1 containing 100 g/l of NaCl + 5 Vp* of polymer P1 at 500 ppm in the solution S1 | S1 containing 100 g/l of NaCl + 5 Vp* of polymer P2 at 500 ppm in the solution S1 |

*Vp corresponds to the pore volume determined in Section 2.1.

Solutions with different salinities are subsequently injected through the core sample. The various following injection sequences are carried out.
1—injection of solution S1 containing 100 g/l of NaCl,
2—injection of solution S2 at 5 g/l of NaCl,
3—injection of solution S1 at 100 g/l of NaCl.

The flow rate for injecting the solutions is constant throughout the tests and is set at 10 cm³/h.

The pressure differential AP through each core sample is measured throughout the injection sequences by virtue of a pre-calibrated differential pressure sensor.

The percentage of residual permeability to water % $K_w$ is calculated according to the following equation:

$$\% \ Kw = 100 * \frac{\Delta P1}{\Delta Px}$$

wherein
ΔP1: pressure differential at the plateau during the core-sample imbibition phase,
ΔPx: pressure differential at the plateau during an injection sequence x (x=1, 2 or 3).

4—Experimental Results

Figure 3:
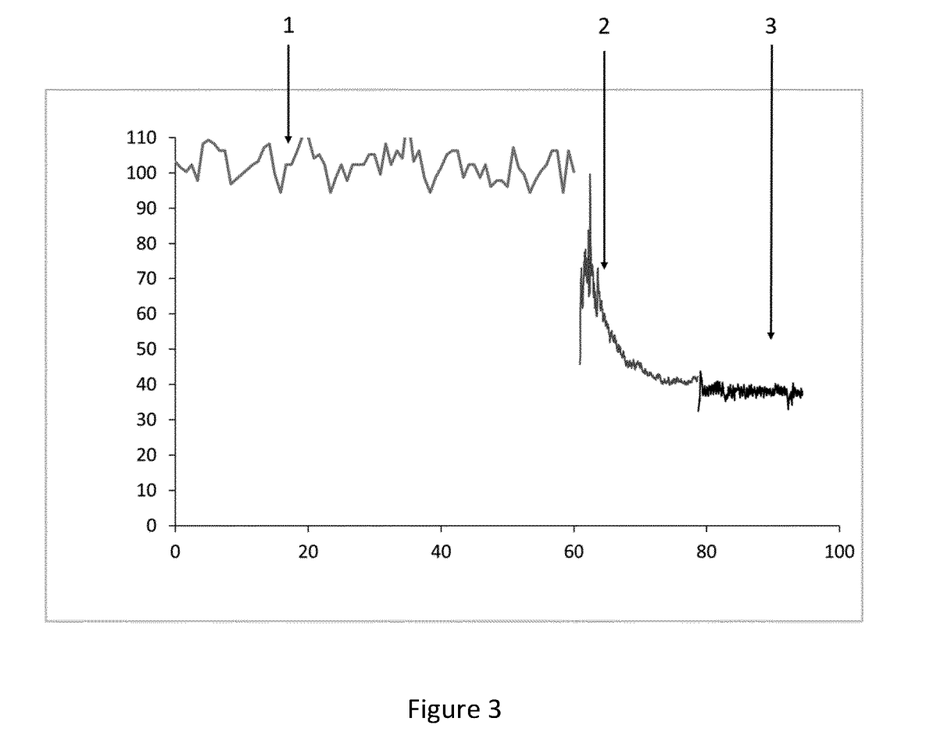
FIG. 3 represents the change in the residual permeability to water of a sandstone core sample not treated using the method of the invention (core sample C1). The x-axis represents the volume in ml of brine injected through the core sample. The y-axis represents the percentage of residual permeability to water % K.
Figure 4:
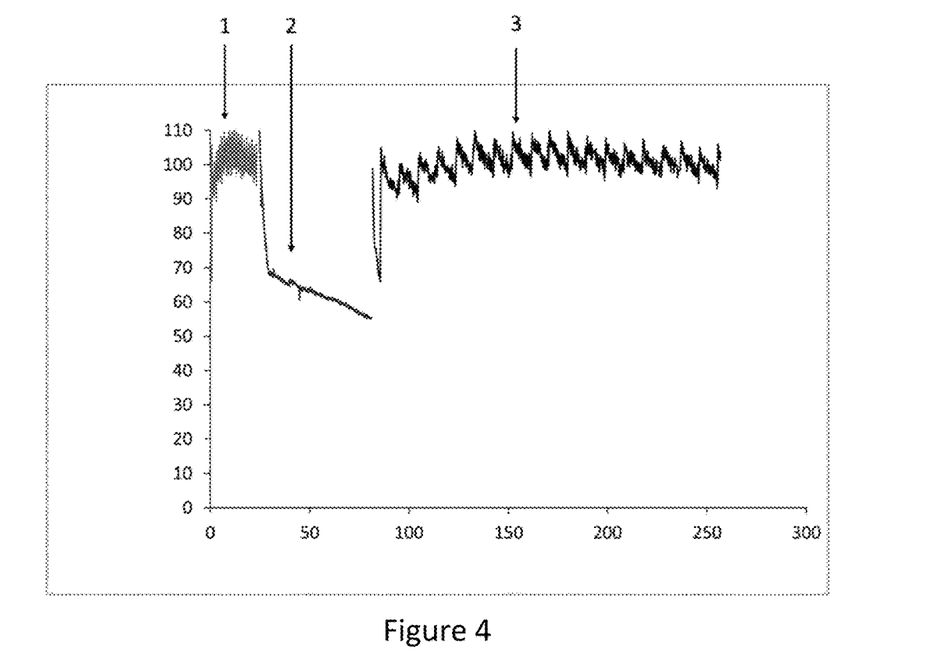
FIG. 4 represents the change in the residual permeability to water of a sandstone core sample treated using the method according to the invention (core sample C2). The x-axis represents the volume in ml of brine injected through the core sample. The y-axis represents the percentage of residual permeability to water % K.
Figure 5:
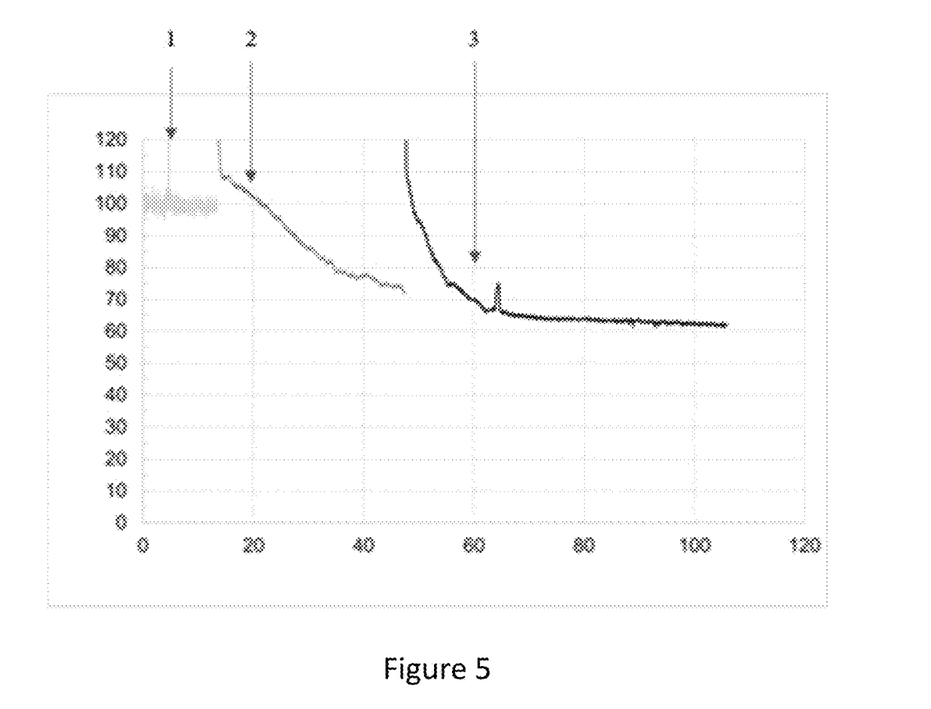
FIG. 5 represents the change in the residual permeability to water of a sandstone core sample treated using a comparative polyacrylamide polymer (core sample C3). The x-axis represents the volume in ml of brine injected through the core sample. The y-axis represents the percentage of residual permeability to water % K.

The results of the measurements of residual permeability to water on the three core samples C1, C2 and C3 are given in FIGS. 3, 4 and 5.

Curve (1) (in light grey) in the three FIGS. 3, 4 and 5 corresponds to the first injection sequence, that is to say the injection of brine containing 100 g/l of NaCl. The percentage of permeability to water % $K_w$ in this case is equal to 100%. It is the reference. During the second sequence of injecting brine containing 5 g/l of NaCl, curve (2) (in dark grey), a considerable drop in the permeability is obtained. This is explained by the activation of the clays contained in the core sample which can swell and propagate. This results in damage to the core sample. The particles can migrate, accumulate and block the pores of the core sample.

During the third injection of brine containing 100 g/l of NaCl, curve (3) (in black), the percentage of residual permeability to water remains low in the case of the non-treated core sample (C1). % $K_w$ is about 40%. This injection shows the irreversible consequences of the injection of brine containing 5 g/l of NaCl. The result is similar for the core sample C3 into which was injected the non-ionic polymer outside the invention with a % $K_w$ of about 60%.

On the other hand, in the case of the core sample C2 treated with the copolymer of the invention, the percentage of residual permeability to water returns to the initial level of 100%. This result demonstrates the effectiveness of the treatment with the copolymer of the invention on the migration of the particles within the sandstone core sample.

These examples therefore clearly demonstrate the effectiveness of the injection of the copolymer according to the invention for limiting and/or averting and/or preventing the migration of fine particles.

5—Effect of the Copolymer Composition on the Wettability of the Core Samples

Experiments were conducted to assess the changes in relative permeability to water and to oil at end points after injection of copolymers of different compositions, in particular copolymers according to the invention (Polymer P1) and organosilane-containing copolymers according to the prior art.

The tests were carried out on Bentheimer sandstone samples in the form of cylindrical core and having an absolute permeability of 1.8 Darcy.

The procedure consists first in determining the relative permeability to water (Krw) at residual oil saturation (Sor) and the relative permeability to oil (Kro) at irreducible water saturation (Swi) of the core. Then, the different copolymers are injected in solution to determine the set of relative permeabilities in the same flow conditions. The following steps are performed:

Mounting the core in a Hassler cell in an oven set at 25° C.,

Saturation of the core with a 2% KCl brine and measurement of absolute permeability k, performing two cycles of oil/brine injection with measurements of end points Kro at Swi and Krw at Sor, Injection of the polymer solution (5 Pore Volume) at 500 ppm in 2% KCl brine at residual oil saturation, Shut in for 48 hours, Water injection and measurement of relative permeability to water at Sor, Oil injection and measurement of relative permeability to oil at Swi.

The obtained results are summarized in Table 2:

TABLE 2

| Relative permeabilities | Initial value | Polymer P1 (according to the invention) | Polymer comprising 13 mol % of organosilane functions (comparative) | Polymer comprising 20 mol % of organosilane functions (comparative) |
|---|---|---|---|---|
| Krw (%) | 0.15 | 0.10 | 0.52 | 0.53 |
| Kro (%) | 0.89 | 0.90 | 0.48 | 0.47 |

Results show that relative permeability to oil has not been affected after the injection of the copolymer according to the invention and has strongly decreased for copolymers comprising organosilane units of 13 mol % and 20 mol %. On the other hand, water permeability has strongly increased after injection of copolymers comprising organosilane units, and has decreased after the injection of the polymer according to the invention. These results show that after injecting copolymers comprising organosilane units, the core becomes oil wet, which induces a loss in oil permeability and a gain in water permeability. This will lead to a drop in well performances. This adverse effect does not occur with the polymer according to the invention, which keeps the core water wet.

II—Field Tests 2 gas-producing wells in different reservoir rocks were treated with the copolymer P1 of the invention. The reservoir rocks consist of clay-loam sandstone rich in fines having the following characteristics:

permeability=10-70 mD,
porosity=15-20%,
total perforation height=5 to 50 m,
temperature=40-50° C.,
salinity=30 000-40 000 TDS (Total Dissolved Salt).

Before treatment, it was observed that the production of sand in these wells occurs in two steps. At the beginning, the sand essentially consists of fines of which the grain size is less than 50 μm. At a subsequent stage, the distribution of the sand grains broadens with a considerable fraction of large particles having a diameter of 100-150 μm or more. Such behaviour reveals a degradation of the rock surrounding the gas-producing well throughout the extraction operation.

Before the treatment with the copolymer of the invention, two batches of brine containing 1% of KCl were injected into the wells in order to verify the injectivity. All the injections were carried out in "bullhead" mode. The term "bullhead" refers to the process of forced pumping of fluids throughout the open interval in a formation without needing to isolate the zone into which the fluid will penetrate. The pressure at the bottom of the well was continually measured by a logging unit.

The polymer solutions were prepared by solubilizing the copolymer P1 at a concentration of between 1000 and 4000 ppm in freshwater comprising 1% of KCl. These solutions are stored at the surface in 10 m³ tanks equipped with blade mixers and pumped in the well by a triplex pumping unit.

The solutions are injected into the wells while maintaining a flow of approximately 10 m³/h. The pressure at the bottom of the well is maintained below 12 000 kPa.

The injection of the polymer solutions is followed by a continuous injection of nitrogen, and the gas extraction is recommenced shortly afterwards.

The comparison of the data obtained before and after the treatment is summarised in the following table:

TABLE 3

| | Before treatment | | Volume of | After treatment | |
|---|---|---|---|---|---|
| Wells | Gas production (kSm³/day) | Presence of sand and of fines | polymer solution injected (m³) | Gas production (kSm³/day) | Presence of sand and of fines |
| 1 | 26 | Yes | 51 | 55 | No |
| 2 | 18 | Yes | 55 | 49 | No |

These results clearly show that the production of sand and fines is halted after the treatment with the polymer of the invention and the gas production yield is considerably improved.

The invention claimed is:

1. A method for averting and/or delaying and/or limiting and/or preventing the migration of fines in a geological formation, said method comprising bringing the formation into contact with one or more copolymers comprising:

at most 40 mol % of monomeric units derived from one or more cationic monomers of formula (Ia) and/or (Ib)

in which
R$_4$ represents a hydrogen atom or a methyl radical,
R$_1$, R$_2$ and R$_3$, which may be identical or different, represent an ethyl radical or a methyl radical,
m represents an integer between 1 and 4,
n represents 1 or 2,
Y represents O, and
X⁻ represents an anion chosen from bromide or chloride ions, at least 60 mol % of monomeric units derived from one or more neutral monomers of formula (II)

in which
R$_5$ represents a hydrogen atom or a methyl radical,
R$_6$ and R$_7$ represent, independently of one another, a hydrogen atom or an alkyl radical comprising from 1 to 4 carbon atoms, which is optionally substituted with a hydroxyl group,
wherein the sum of the repeating units derived from the cationic monomer of formula (Ia) and/or (Ib) and the repeating units derived from the neutral monomer of formula (II) represents at least 95 mol % of the total sum of the repeating units of the copolymer, and the copolymer does not comprise organosilane units,
wherein the copolymer has an average molar mass ranging from 3×10⁶ g·mol⁻¹ to 12×10⁶ g·mol⁻¹, and wherein the method does not comprise injecting acidic compounds into the geological formation.

2. The method according to claim 1, wherein the copolymer comprises at most 30 mol % of monomeric units derived from one or more cationic monomers of formula (Ia) and/or (Ib).

3. The method according to claim 2, wherein the copolymer comprises at most 20 mol % of monomeric units derived from one or more cationic monomers of formula (Ia) and/or (Ib).

4. The method according to claim 1, wherein the cationic monomers of formulae (Ia) and (Ib) are chosen from diallyldialkylammonium and allyltrialkylammonium salts; acidified or quaternized salts of dialkylaminoalkyl acrylates, or quaternized salts of dialkylaminoalkylmethacrylates.

5. The method according to claim 4, wherein the cationic monomers of formulae (Ia) and (Ib) are chosen from diallyldimethylammonium chloride (DADMAC), (2-(Acryloyloxy)ethyl) trimethylammonium chloride (ADAMEMC), and (2-(Methacryloyloxy)ethyl)trimethylammonium chloride (MADAMEMC).

6. The method according to claim 1, wherein the monomer of formula (II) is chosen from acrylamide, methacrylamide, N,N-di-methylacrylamide, N-methylmethacrylamide, N-ethylmethacrylamide, N-propylmethacrylamide, N-isopropylmethacrylamide, N-(2-hydroxyethyl) methacrylamide, N-methylacrylamide, N-ethylacrylamide, N-propylacrylamide or N-(2-hydroxyethyl) acrylamide, and N-[2-hydroxy-1,1-bis(hydroxymethyl)ethyl]propenamide.

7. The method according to claim 6, wherein the monomer of formula (II) is chosen from acrylamide; N,N-dimethylacrylamide; N-[2-hydroxy-1,1 bis(hydroxymethyl)ethyl]propenamide; and 2-hydroxyethylacrylamide.

8. The method according to claim 1, wherein the sum of the repeating units derived from the cationic monomer of formula (Ia) and/or (Ib) and the repeating units derived from the neutral monomer of formula (II) represents from 98% to 100% of the total sum of the repeating units of the copolymer.

9. The method according to claim 1, wherein the formation is a subterranean formation.

10. The method according to claim 9, wherein the subterranean formation is in contact with an oil-producing and/or gas-producing well.

11. The method according to claim 1, wherein the formation is a subterranean formation in contact with a water table.

12. The method according to claim 1, wherein the copolymers are in a carrier fluid.

13. The method according to claim 12, wherein the carrier fluid is water.

14. The method according to claim 13, wherein the carrier fluid comprises from 500 to 5000 ppm of the one or more copolymers.

15. The method according to claim 12 wherein the carrier fluid does not include any acidic compounds.

16. The method according to claim 1, which also comprises a step of pre-treating the formation before the bringing into contact with the copolymers.

17. The method according to claim 1, wherein in the formula (Ia) and/or formula (Ib) $R_1=R_2=R_3=CH_3$.

18. A method for averting and/or delaying and/or limiting and/or preventing the migration of fines in a geological formation, said method comprising bringing the formation into contact with one or more copolymers comprising:

at most 40 mol % of monomeric units derived from one or more cationic monomers of formula (Ia) and/or (Ib)

in which
$R_4$ represents a hydrogen atom or a methyl radical,
$R_1$, $R_2$ and $R_3$, which may be identical or different, represent an ethyl radical or a methyl radical,
m represents an integer between 1 and 4,
n represents 1 or 2,
Y represents O, and
$X^-$ represents an anion chosen from bromide or chloride ions, at least 60 mol % of monomeric units derived from one or more neutral monomers of formula (II)

in which
$R_5$ represents a hydrogen atom or a methyl radical,
$R_6$ and $R_7$ represent, independently of one another, a hydrogen atom or an alkyl radical comprising from 1 to 4 carbon atoms, which is optionally substituted with a hydroxyl group,
wherein the sum of the repeating units derived from the cationic monomer of formula (Ia) and/or (Ib) and the repeating units derived from the neutral monomer of formula (II) represents at least 95 mol % of the total sum of the repeating units of the copolymer, and the copolymer does not comprise organosilane units,
wherein the copolymer has an average molar mass ranging from $3 \times 10^6$ g·mol$^{-1}$ to $12 \times 10^6$ g·mol$^{-1}$, and
wherein the method does not comprise injecting of acidic compounds into the geological formation, and
wherein the copolymers are in a carrier fluid that does not comprise at least one of methanol, ethanol and isopropanol.

19. The method according to claim 18, wherein the carrier fluid comprises none of methanol, ethanol and isopropanol.

20. A method for averting and/or delaying and/or limiting and/or preventing the migration of fines in a geological formation, said method comprising bringing the formation into contact with one or more non-crosslinked copolymers comprising:

at most 40 mol % of monomeric units derived from one or more cationic monomers of formula (Ia) and/or (Ib)

in which
$R_4$ represents a hydrogen atom or a methyl radical,
$R_1$, $R_2$ and $R_3$, which may be identical or different, represent an ethyl radical or a methyl radical,
m represents an integer between 1 and 4,
n represents 1 or 2,
Y represents O, and
$X^-$ represents an anion chosen from bromide or chloride ions, at least 60 mol % of monomeric units derived from one or more neutral monomers of formula (II)

in which
- $R_5$ represents a hydrogen atom or a methyl radical,
- $R_6$ and $R_7$ represent, independently of one another, a hydrogen atom or an alkyl radical comprising from 1 to 4 carbon atoms, which is optionally substituted with a hydroxyl group, wherein the sum of the repeating units derived from the cationic monomer of formula (Ia) and/or (Ib) and the repeating units derived from the neutral monomer of formula (II) represents at least 95 mol % of the total sum of the repeating units of the copolymer, and the copolymer does not comprise organosilane units, wherein the copolymer is solubilized at a concentration of 1000-4000 ppm in 1% KCl, wherein the copolymer is provided in a powder form having a particle size within the range of 250 microns to 1 mm, wherein the copolymer has an average molar mass ranging from $3 \times 10^6$ g·mol$^{-1}$ to $12 \times 10^6$ g·mol$^{-1}$, and wherein the method does not comprise injecting acidic compounds into the geological formation.

* * * * *